(12) United States Patent
Moskob

(10) Patent No.: US 6,661,139 B1
(45) Date of Patent: Dec. 9, 2003

(54) MOTOR-GEAR UNIT WITH INTEGRATED ECCENTRIC WHEEL GEAR

(75) Inventor: Frank Moskob, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,845
(22) PCT Filed: Dec. 18, 1999
(86) PCT No.: PCT/DE99/04044
§ 371 (c)(1), (2), (4) Date: Dec. 29, 2000
(87) PCT Pub. No.: WO00/71908
PCT Pub. Date: Nov. 30, 2000

(30) Foreign Application Priority Data

May 25, 1999 (DE) .......................... 199 23 877

(51) Int. Cl.[7] .......................... H02K 7/10; H02K 7/116; F16H 1/32
(52) U.S. Cl. .......................... 310/83; 310/82; 475/149
(58) Field of Search .................. 310/82, 83; 475/149

(56) References Cited

U.S. PATENT DOCUMENTS

| | | | | |
|---|---|---|---|---|
| 3,167,409 A | * | 1/1965 | Brucken | 310/83 |
| 3,558,944 A | * | 1/1971 | Verge | 310/82 |
| 4,228,698 A | | 10/1980 | Winiasz | |
| 4,367,424 A | * | 1/1983 | Presley | 310/82 |
| 5,479,058 A | | 12/1995 | Seidou | |
| 6,280,359 B1 | * | 8/2001 | Moskob | 455/149 |

FOREIGN PATENT DOCUMENTS

| | | | | |
|---|---|---|---|---|
| DE | 196 18 248 C | | 10/1997 | |
| DE | 197 29 620 A | | 1/1998 | |
| DE | 198 50 908 A1 | * | 5/2000 | F16H/1/323 |
| DE | 199 19 922 A1 | * | 9/2000 | F16H/1/32 |
| JP | 4-172944 | * | 6/1992 | H02K/7/116 |
| JP | 4-317552 | * | 11/1992 | H02K/41/06 |
| WO | 99 39114 A | | 8/1999 | |
| WO | WO00/55523 | * | 9/2000 | H02K/7/116 |

* cited by examiner

Primary Examiner—Karl Tamai
(74) Attorney, Agent, or Firm—Michael J. Striker

(57) ABSTRACT

A motor-gear unit, having an eccentric wheel gear, driven by a rotary drive (3), which eccentric wheel gear has an eccentric element (8), an eccentric wheel (10) rotatably supported on the eccentric element, and a driver (15), and the driver (15) cooperates with the eccentric wheel (10) by intermittent meshing, further having at least one guide bolt (22), which cooperates with the eccentric wheel (10) and both assures the eccentric motion of the eccentric wheel (10) and prevents an undesired rotation of the eccentric wheel 10. It is proposed that the eccentric wheel gear is disposed in a free installation space of the rotary drive (3).

9 Claims, 4 Drawing Sheets

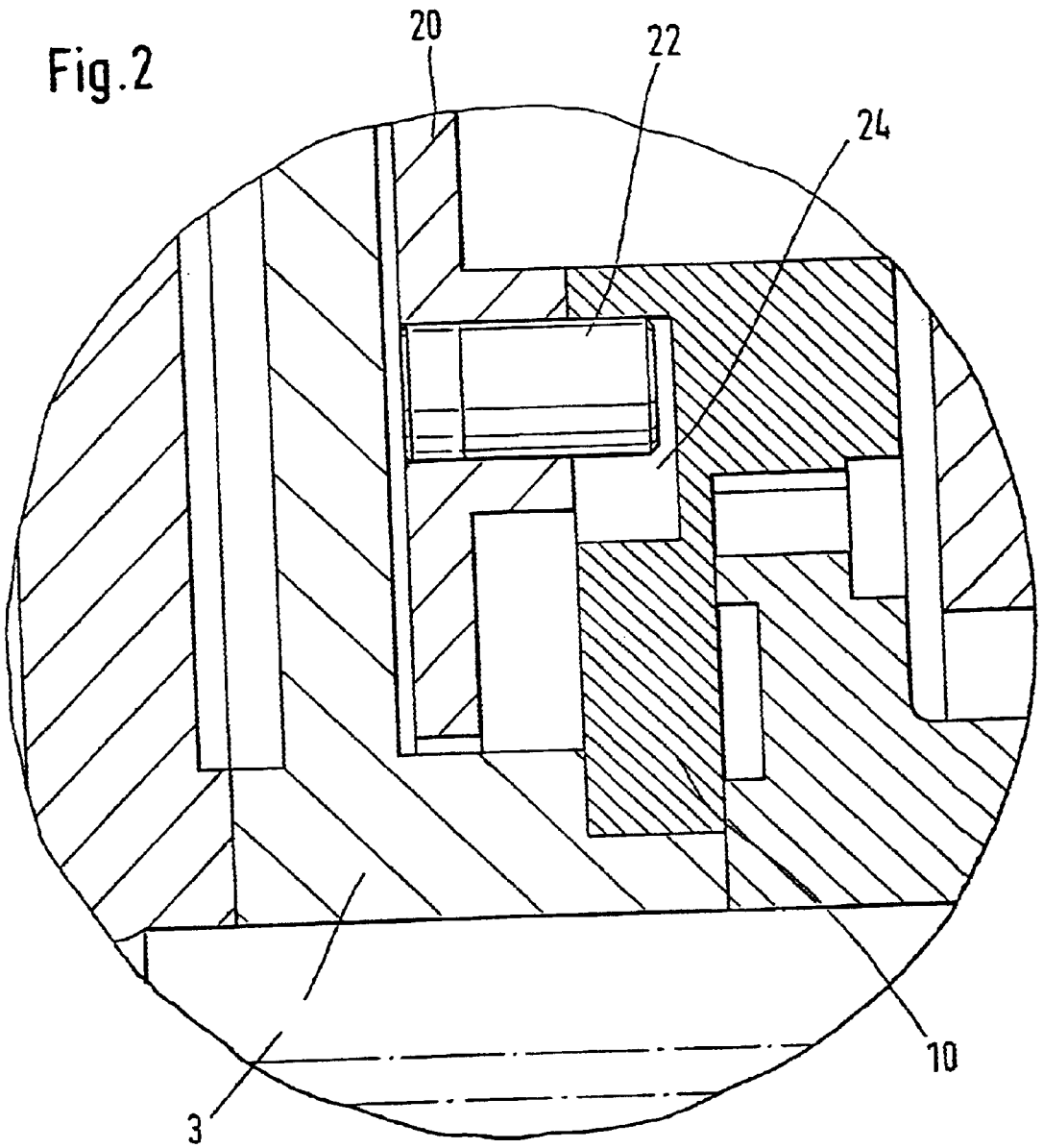

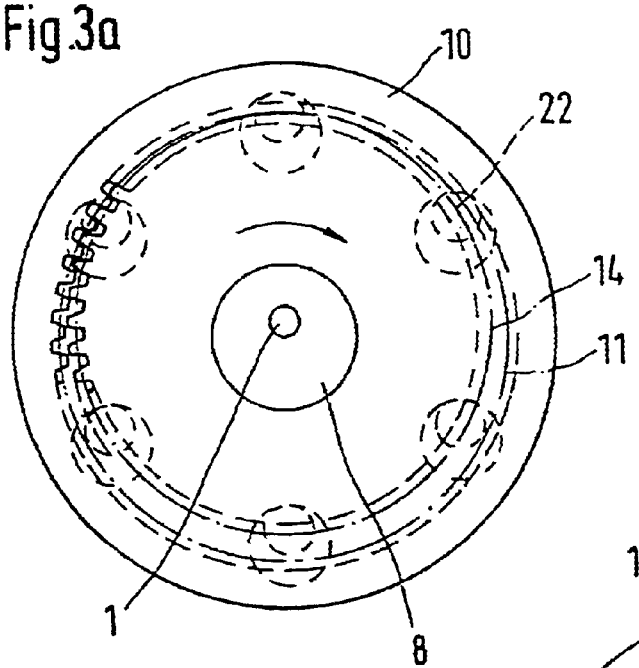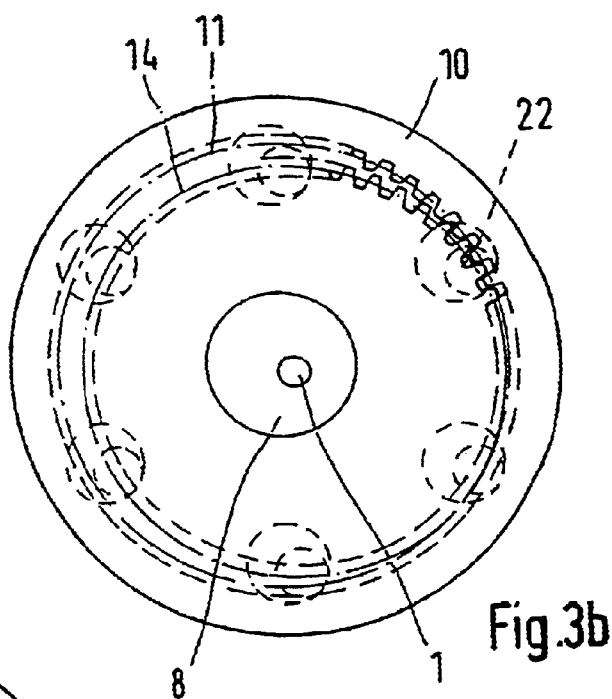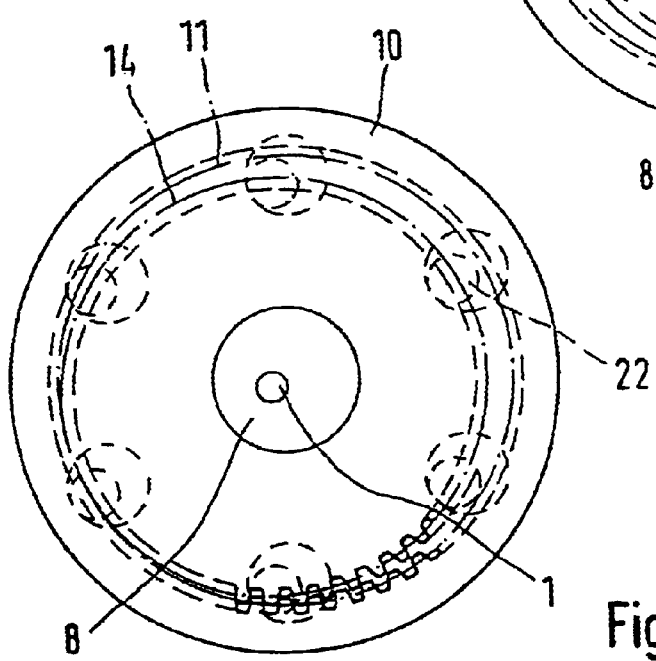

MOTOR-GEAR UNIT WITH INTEGRATED ECCENTRIC WHEEL GEAR

PRIOR ART

Figure 1:
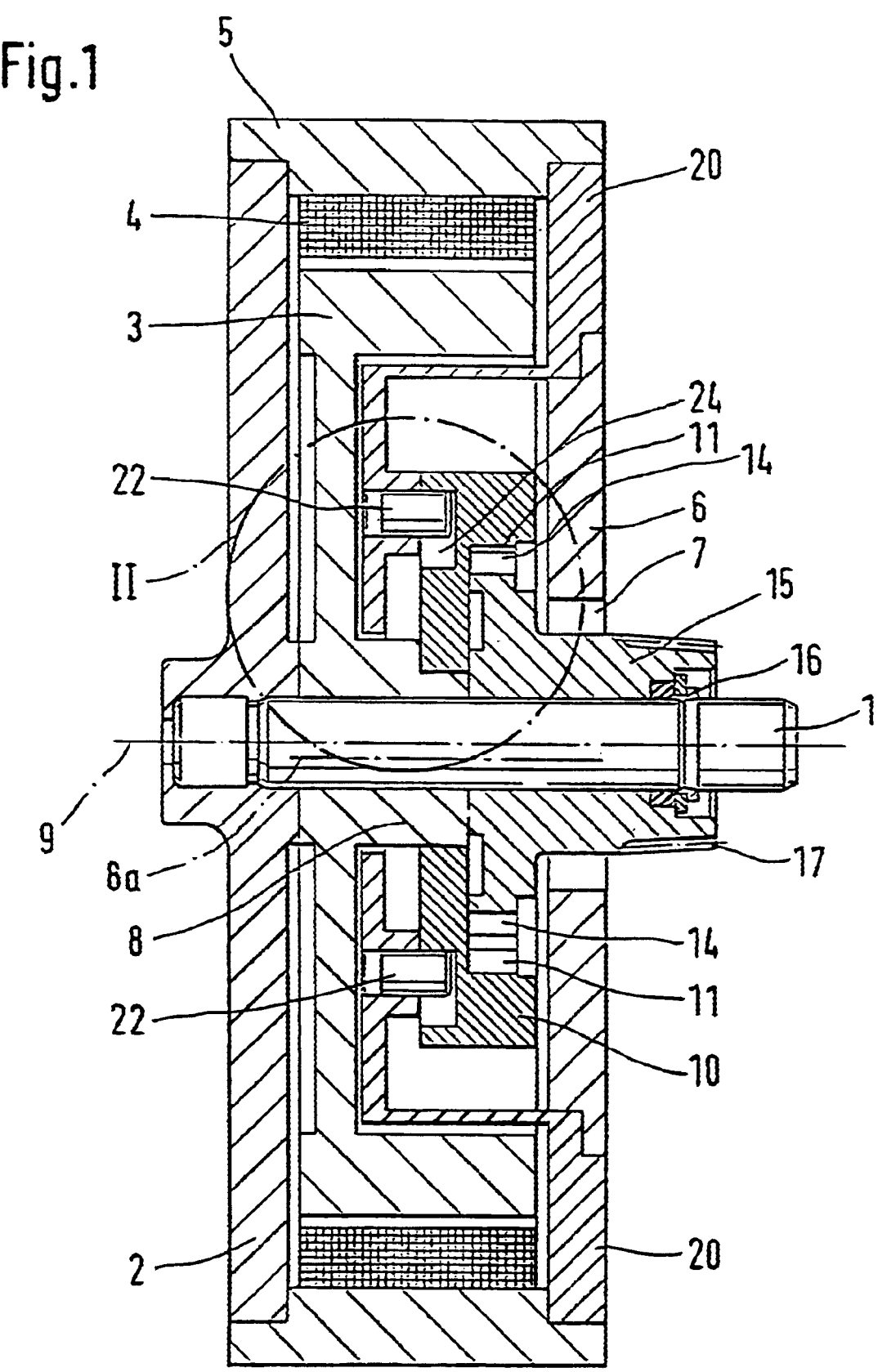

The invention relates to a motor-gear unit, having an eccentric wheel gear driven by a rotary drive, as generically defined by the preamble to the main claim.

To reduce the rotary speed of control motors with an armature rpm of about 7000 revolutions per minute, worm gears are often used. These worm gears, which are driven by electric motors, are distinguished by having self-inhibition from the power takeoff side. Because of the necessarily high gear ratio required to attain adequate torques, for instance to drive window controls or a sunroof in a motor vehicle, the external dimensions of an adjusting motor, comprising a motor and gears disposed side by side, is considerable.

Other types of gear, used in so-called friction-drum motors, are known, for instance from German Patent Disclosure DE 196 18 248. These friction-drum motors have a tubular motor housing, which surrounds a drum-type armature with an eccentric wheel gear disposed downstream of it. Using eccentric wheel gears is advantageous because while having very compact dimensions they have self-inhibition and a simple design. Compared with the known worm gears, the eccentric wheel gear is comparatively invulnerable to tolerances, since all the rotating parts are supported on one shaft.

The disposition of the eccentric wheel gear, in the friction-drum motor described in DE 196 18 248, however, is such that in this motor-gear unit as well, the external dimensions are comparatively large. It is unsuited to applications where there is severely restricted installation space, for instance for sunroofs or window control systems in motor vehicles.

ADVANTAGE OF THE INVENTION

The motor-gear unit according to the invention having the characteristics of the main claim has the advantage of extremely great compactness, since the eccentric wheel gear is disposed in a free installation space of the rotary drive. By integrating the gear with the drive, the structural length of the unit is reduced considerably and can be selected to be quite small compared to its diameter.

A further advantage of the integration of the gear according to the invention is that imbalance forces occurring during operation at the eccentric wheel can be compensated for very simply and precisely by means of suitable counterweights on the rotary drive.

By means of the characteristics recited in the dependent claims, advantageous refinements of the motor-gear unit defined by the main claim are possible.

An especially compact design of the motor-gear unit is attained if the eccentric wheel gear is surrounded by a rotor of the rotary drive. The inside diameter of the rotor is selected to be great enough that there is space for the gear inside this diameter. The gear can thus be inserted all the way into the drive, and an especially advantageous shallow design is attained.

It is also advantageous if the at least one guide bolt, which assures the eccentric motion of the eccentric wheel and prevents undesired rotation of the eccentric wheel, is disposed on a housing part that divides the free installation space from the rotary drive. Thus the guide bolts that are required to operate the eccentric wheel and that advantageously guide the eccentric wheel can be integrated with the motor-gear unit as well.

If this at least one guide bolt protrudes into a preferably circular recess on the eccentric wheel, then the eccentric motion of the eccentric wheel is assured, yet at the same time rotation of the eccentric wheel is prevented.

If the inside width of the recess in the eccentric wheel is equivalent to twice the eccentricity of the eccentric element, then the at least one guide bolt can roll along the wall of the recess, and the desired guidance effect is made possible in an optimal way.

It is also advantageous if a plurality of guide bolts are disposed, symmetrically, about the eccentric wheel on the housing part. It has been demonstrated in practice that a uniform power takeoff rpm is attained by means of at least three bolts offset from one another by an angle of 120°. If the number of bolts is increased further, then not only is the synchronous operation of the motor-gear unit improved, but the forces operative in operation and thus the mechanical stresses are also distributed uniformly to the individual bolts.

The intermittent meshing of the eccentric wheel with the driver is advantageously attained in that the eccentric wheel has an internal toothing and the driver has an external toothing.

In an especially advantageous variant, the rotary drive is an electronically commutated motor.

If the eccentric element is formed directly onto the rotor, then the two components can advantageously be made in one piece.

DRAWING

In the drawing, one exemplary embodiment of a motor-gear unit according to the invention is shown, and this is explained in further detail in the ensuing description.

Shown are

Figure 4:
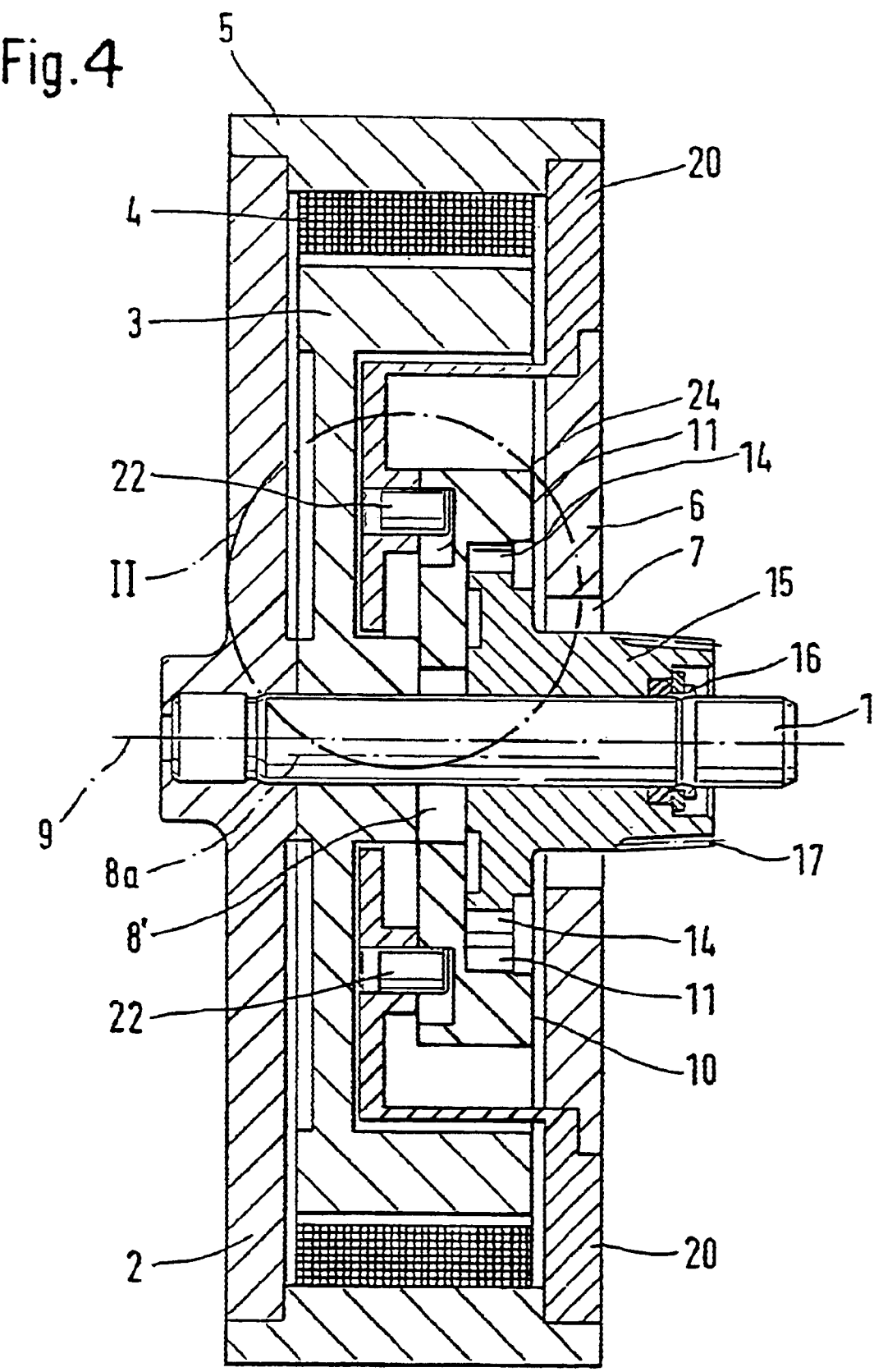

FIG. 1, a motor-gear unit in longitudinal section;

FIG. 2, the enlarged region II of FIG. 1;

FIG. 3a, an illustration of a first operating position of the eccentric gear wheel;

FIG. 3b, an illustration of a second operating position of the eccentric gear wheel;

FIG. 3c, an illustration of a third operating position of the eccentric gear wheel; and FIG. 4, shows another embodiment of the motor-gear unit.

DESCRIPTION OF THE EXEMPLARY EMBODIMENT

The exemplary embodiment, shown in FIG. 1, of a motor-gear unit according to the invention shows an electric motor with an eccentric wheel gear, which has a shaft 1 that is secured in a housing bottom 2 in a manner fixed against relative rotation. A rotary drive with a rotor 3 is rotatably disposed on the shaft 1 and is driven by coils 4 of the electric motor. The coils 4 are disposed on the inside in a cylindrical housing portion 5, and the housing bottom 2 is also secured to the housing portion 5. On the side of the housing portion 5 opposite the housing bottom 2, a housing part 6 in the form of a cap with a central opening 7 is mounted in fixed fashion. The end of the shaft 1 remote from the housing bottom 2 protrudes through this central opening 7.

The housing portion 5, housing bottom 2, and cap 6 form a motor housing, in whose interior the rotor 3 is disposed, which is rotatable on the shaft 1 and is provided with an eccentric element 8 that extends axially along the center axis 9 and that is provided with an eccentric axis 8a. An eccentric wheel 10 is rotatably supported on the eccentric element 8 and is provided with an internal toothing 11.

The internal toothing 11 of the eccentric wheel 10 meshes intermittently with an external toothing 14 of a driver 15 that is supported rotatably on the shaft 1 and is axially secured with fastening means 16. The driver 15 protrudes through the housing part 6 out of the motor housing, and in this region, for the gear output, it is provided with a further external toothing 17.

The version of the rotary drive 3 shown in FIG. 1 has the effect that within the rotary drive 3, a free installation space is created, into which the eccentric wheel gear is integrated. The drive and the gear are supported on the same shaft 1.

For spatial separation of the free installation space from the motor region, a gear housing part 20 is provided, on which the guide bolts 22 for the eccentric wheel 10 are disposed in fixed fashion. The guide bolts 22 protrude into recesses 24, which are embodied in circular form and machined into the eccentric wheel 10.

The characteristics pertaining to the guide bolts 22 are shown once again in an enlarged view in FIG. 2 for the sake of greater clarity. In this FIG. 2, as in all the other drawings, the same characteristics are provided with the same reference numerals.

In FIGS. 3a–3c, three different operating positions of the eccentric gear wheel are shown. For comprehension of these drawings, the basic mode of operation of an eccentric wheel gear will now be explained again briefly.

By means of the magnetic field induced in the coils 4 of FIG. 1, the rotor 3 rotates about the shaft 1, which is connected to the housing bottom 2 in a manner fixed against relative rotation. As a result of the rotation of the rotor 3, the eccentric element 8 also rotates about the shaft 1.

The eccentric wheel 10 rotatably supported on the eccentric element 8 would roll with its internal toothing 11 along the external toothing of the driver 15, but on its own—because of the guidance by the guide bolts 22—it cannot execute any rotation about itself. Thus the driver 15, also rotatably connected to the shaft 1, rolls with its toothing 14 along the internal toothing 11. As a result of this rolling of the driver 15 in the eccentric wheel 10, a step down in the rotary motion of the driver 15 is attained, which is carried onward via the external toothing 17 of the driver 15.

The eccentric wheel 10 consequently executes a circular motion, which is permitted by the guide bolts 22, since the guide bolts 22 are guided in the circular recesses 24 of the eccentric wheel 10.

If the diameter of the circular recesses 24 in the eccentric wheel 10 is equivalent to twice the eccentricity of the eccentric element 8, then the guide bolts 22 can roll in an ideal way along the inside surface of the circular recesses 24. This enables the driver 15 to roll in the eccentric wheel 10, which is shown in FIGS. 3a–3c at 0°, 120° and 240° for the three different positions.

The motor-gear unit according to the invention is naturally not limited to the exemplary embodiment described; what is decisive is that the eccentric wheel gear is integrated into the free installation space of the drive, thus achieving an especially shallow and compact design.

What is claimed is:

1. A motor-gear unit, having an eccentric wheel gear, driven by a rotary drive (3), which eccentric wheel gear has an eccentric element (8), an eccentric wheel (10) rotatably supported on the eccentric element, and a driver (15), and the driver (15) cooperates with the eccentric wheel (10) by intermittent meshing, further having at least one guide bolt (22), which cooperates with the eccentric wheel (10) and both assures the eccentric motion of the eccentric wheel (10) and prevents an undesired rotation of the eccentric wheel (10), characterized in that the eccentric wheel gear is disposed in a free installation space of the rotary drive (3), and wherein the at least one guide bolt (22) is disposed on a housing part (20) that divides the free installation space from the rotary drive.

2. The motor-gear unit of claim 1, characterized in that the eccentric wheel gear is surrounded by a rotor (3) of the rotary drive.

3. The motor-gear unit of one claim 1, characterized in that the at least one guide bolt (22) protrudes into a preferably circular recess (24) on the eccentric wheel (10).

4. The motor-gear unit of claim 3, characterized in that an inside width of the recess (24) in the eccentric wheel (10) is equivalent to twice the eccentricity of the eccentric element (8).

5. The motor-gear unit of claim 1, characterized in that a plurality of guide bolts (22) are disposed, preferably symmetrically, about the eccentric wheel (10) on the housing part.

6. The motor-gear unit of claim 1, characterized in that the eccentric wheel (10) has an internal toothing (11).

7. The motor-gear unit of claim 1, characterized in that the driver (15) has an external toothing (14).

8. The motor-gear unit of claim 1, characterized in that the rotary drive is an electronically commutated motor.

9. The motor-gear unit of claim 1, characterized in that the eccentric element (8) is formed directly onto the rotor (3).

* * * * *